July 7, 1953            D. ABRAHAM            2,644,491

TILTABLE BAND SAW MACHINE

Filed Feb. 10, 1951            3 Sheets-Sheet 1

INVENTOR
DAVID ABRAHAM
BY Chapin + Neal
ATTORNEYS

July 7, 1953
D. ABRAHAM
2,644,491
TILTABLE BAND SAW MACHINE
Filed Feb. 10, 1951
3 Sheets-Sheet 2
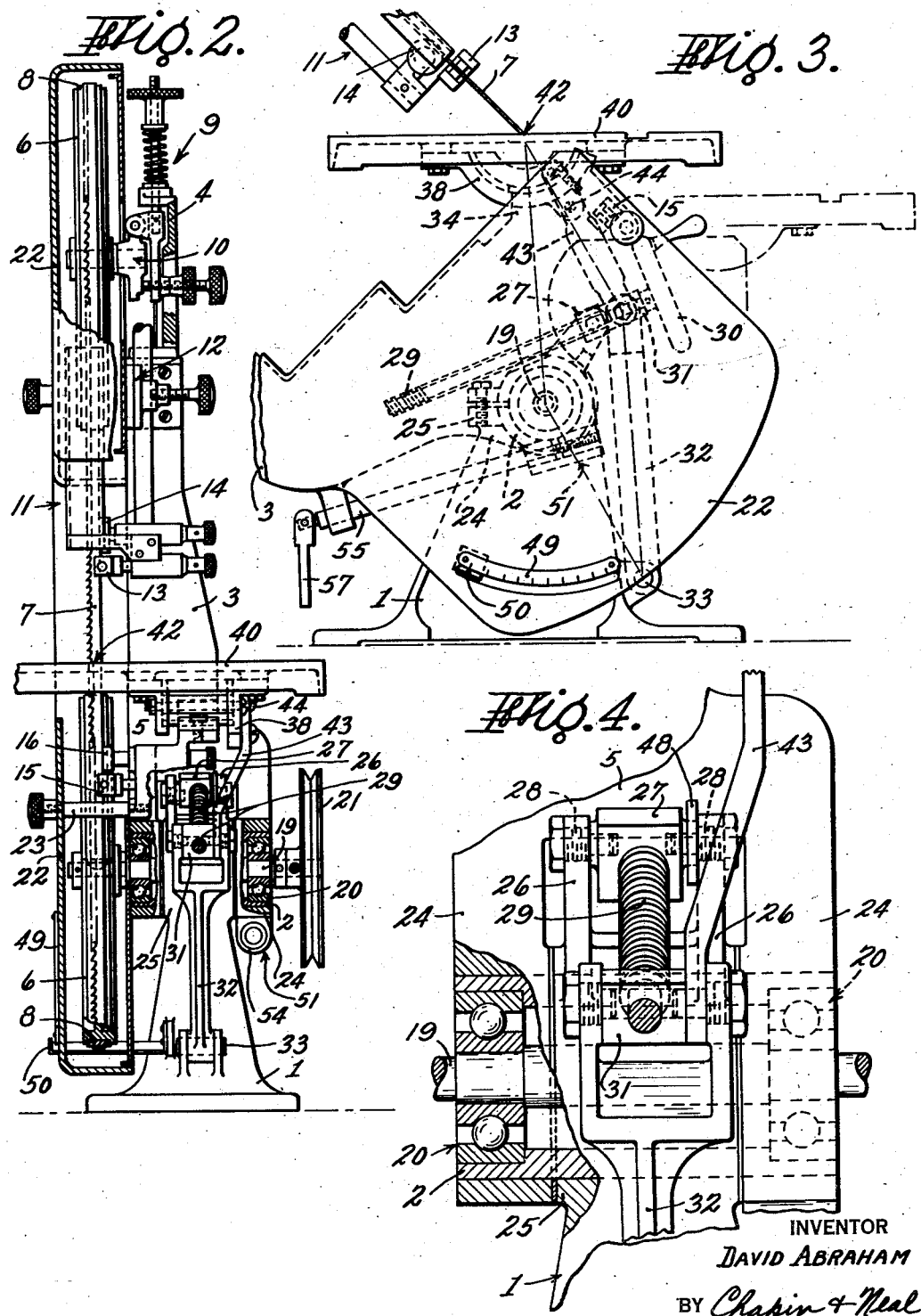
INVENTOR
DAVID ABRAHAM
BY Chapin & Neal
ATTORNEYS July 7, 1953
D. ABRAHAM
2,644,491
TILTABLE BAND SAW MACHINE
Filed Feb. 10, 1951
3 Sheets-Sheet 3
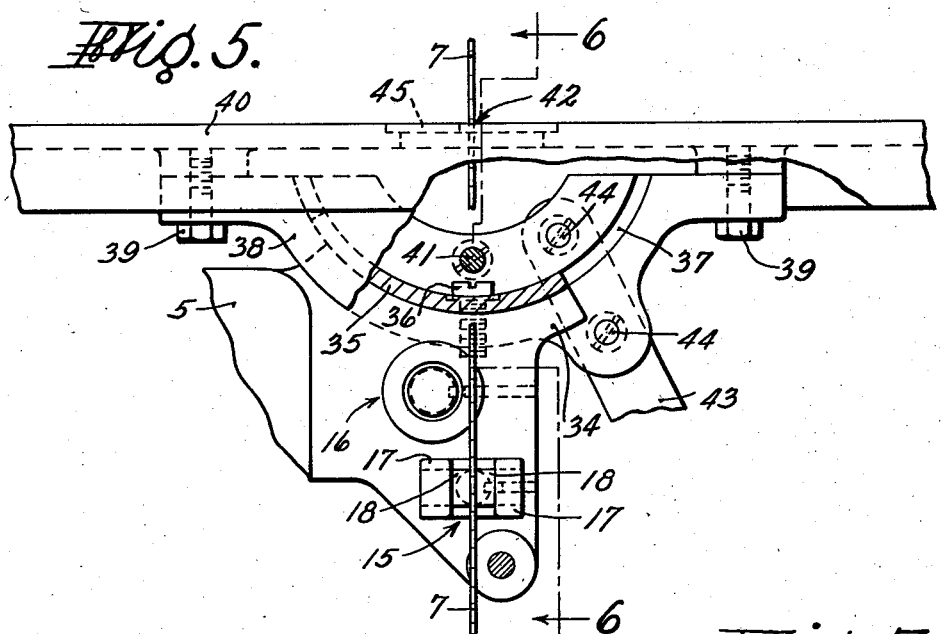
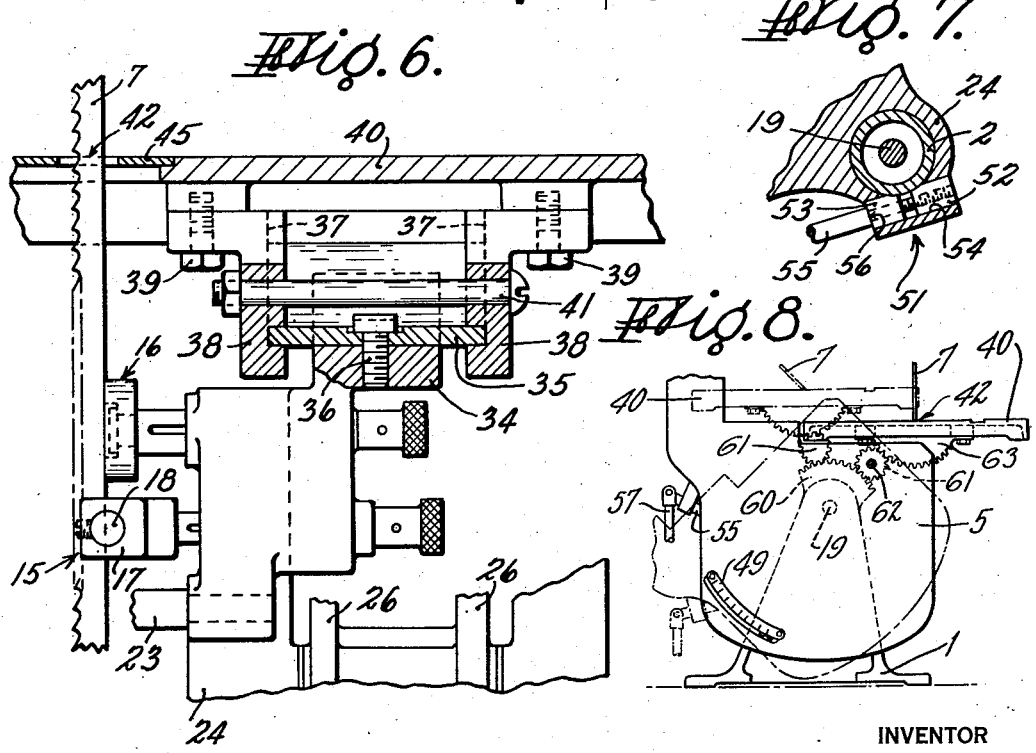
INVENTOR
DAVID ABRAHAM
BY Chapin & Neal
ATTORNEYS Patented July 7, 1953

2,644,491

UNITED STATES PATENT OFFICE 2,644,491

TILTABLE BAND SAW MACHINE

David Abraham, Waltham, Mass., assignor to Hampden Brass and Aluminum Company, Springfield, Mass., a corporation of Massachusetts Application February 10, 1951, Serial No. 210,361

11 Claims. (Cl. 143—24)

This invention relates to a band-saw machine having means for selectively changing the angle between the saw blade and the work table.

Such change of angular relationship between the saw blade and table is desirable for cutting bevels and other purposes. In machines commonly in use this change of angle is effected by changing the angle of the table relative to the saw blade, the latter traveling in a fixed path.

More satisfactory results from the standpoint of accuracy and ease in holding the work on the table are secured if the work table is held horizontal and the saw blade is tilted relative to the table. Various structures have been proposed which operate in the latter manner but such structures have proved unsatisfactory because of the complicated mechanisms involved in their operation and the excessive costs of manufacture and maintenance.

The principal object of the invention is to provide a band-saw in which the blade may be easily and rapidly adjusted through large as well as small angles relative to the table, the latter being maintained substantially horizontal, and which may be so adjusted while the blade is in motion with a minimum of effort and attention from the operator.

It is a further object to provide such a machine which is light, simple and inexpensive to construct and maintain.

Broadly stated, the general and specific objects of the invention are secured by providing means to impart a planetary motion to the table, as it is moved with the saw and its frame about the axis of the pivotal connection of the saw frame to its support.

These as well as other and more particular objects relating to details of construction will be made clear in the following description, the accompanying drawings, and in the claims.

In the drawings:

Fig. 2 is a view looking from the right of Fig. 1, parts being broken away;

Fig. 3 is a view similar to Fig. 1 showing the saw blade tilted;

Fig. 4 is a view on an enlarged scale taken from the right-hand side below the table of Fig. 1 to show details of construction;

Fig. 5 is a fragmentary side elevational view on a larger scale showing the pivotal mounting of the table, parts being broken away;

Fig. 6 is a view on line 6—6 of Fig. 5;

Fig. 7 is an enlarged detail of the clamp between the tilting frame and the base of the machine; and Fig. 8 is a diagrammatic view of an alternative arrangement.

Figure 1:
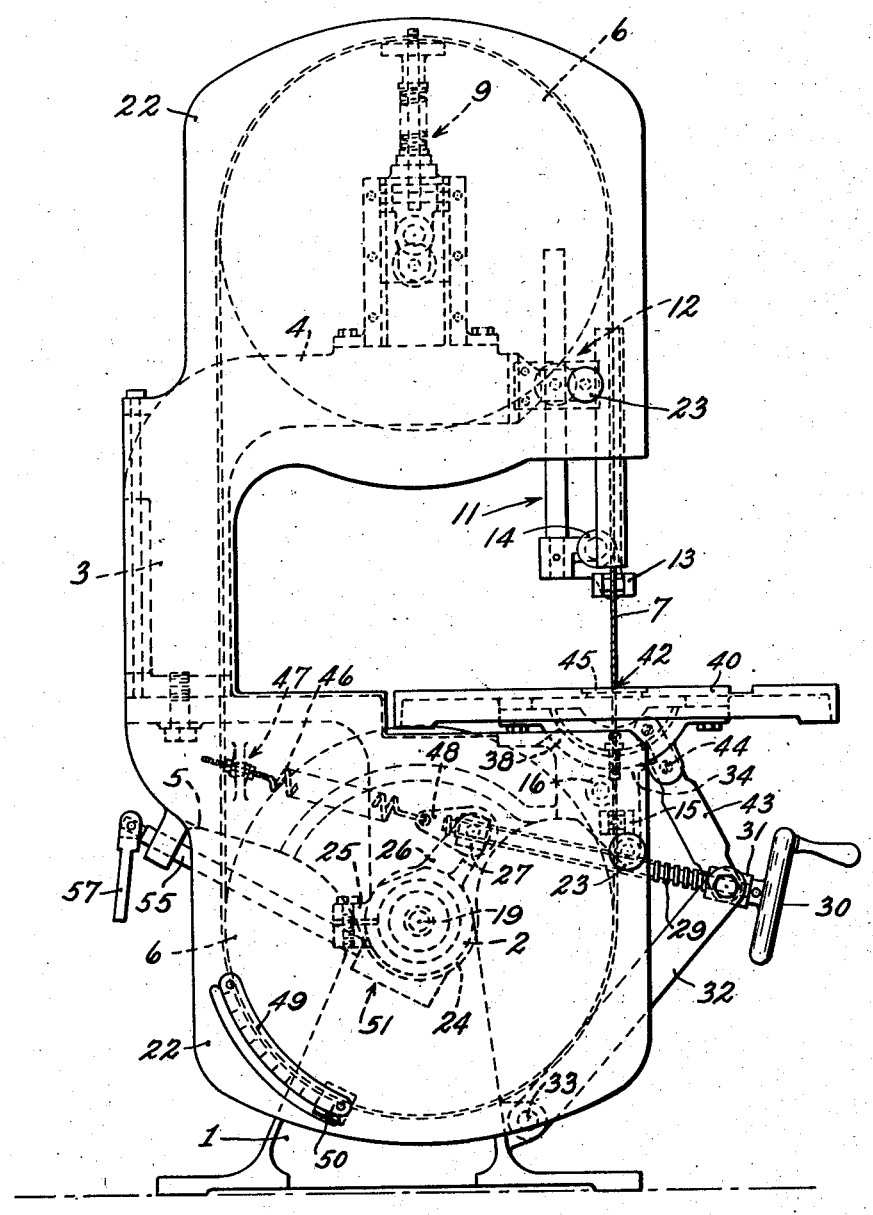
Fig. 1 is a side elevation of a band-saw machine embodying the invention.

The band-saw machine includes a fixed base 1 pivotally supporting, by means of a sleeve indicated at 2, a C-frame 3, having upper and lower arms 4 and 5 respectively. Spaced upper and lower band wheels 6 are rotatably supported, in a common plane, which is also the plane in which the frame 3 pivots, on the upper arm 4 of the C-frame and on the base, respectively. A flexible band-saw blade 7 is tensioned about the wheels 6 on frictional wheel rims 8. A resilient wheel adjusting device, generally indicated at 9, of any suitable conventional type, is provided on the upper arm 4 of the C-frame to move the upper wheel 6 toward and away from the lower wheel for adjustment of the tension of the blade 7 as desired.

A post 11 is adjustable vertically on the upper frame arm 4, being held thereon by a yoke and screw device indicated generally at 12. The post 11 carries, at its lowermost end portion, an upper saw blade guide 13 and an upper blade bearing 14 which may be of usual construction. Lower guide 15 and bearing 16 are mounted on the lower arm 5 of the C-frame as is shown most clearly in Figs. 5 and 6. Guide 15 (guide 13 is identical) includes a pair of arms 17 at the sides of the saw blade 7, with guide pins 18 adjustable toward and away from the blade. The bearing 16 (bearing 14 is identical) is provided with a rotatable disc against which the running blade 7 may bear as a piece of work is pressed against the saw edge of the blade.

The lower wheel 6 is fixed on a shaft 19 which is rotatably supported in bearings at 20 in the sleeve 2 and which is driven by a pulley wheel 21 (Fig. 2) fixed on the shaft 19. The wheel 21 may be driven by a belt (not shown) powered by any suitable means such as an electric motor (not shown). A cover 22 supported and spaced from the C-frame by studs 23 is provided to encase the wheels 6 and most of the blade 7.

The lowermost portion of the lower frame arm 5 is bifurcated to form two spaced lugs 24 (Figs. 2 and 4) which embrace a head 25 at the upper portion of base 1. The head 25 is in the form of a split clamp which is integral with base 1 and which secures the sleeve 2 to the base. The ends of sleeve 2 extend through openings in the lugs 24 and the sleeve forms the pivot about which the frame 3 tilts.

Extending upwardly and forwardly from the head 25 and integral therewith are a pair of spaced ears 26 which lie inside the lugs 24 (Fig. 4). A small pivot block 27 is pivotally mounted between ears 26 by means of pins 28, and the block is provided with an internally threaded aperture extending between the pins 28 and at right angles thereto. The innermost end of a jack screw 29 is threaded into the aperture, with the outermost end of the screw extending forwardly of the machine and carrying a hand wheel 30.

The screw is supported at its outer end in a pivot block 31 which is pivoted to the upper end of a link 32, the lower end of which is pivoted at 33 to the base 1. The screw is rotatably mounted in block 31, but is held against longitudinal movement relative thereto.

The free end of arm 5 is formed with an arcuate cradle 34 in which an arcuate plate 35 is secured by a machine screw 36. As best shown in Fig. 6 the edges of the plate 35 extend outwardly of the sides of the cradle and engage in arcuate grooves 37 formed in the adjacent faces of spaced trunnion brackets 38 secured by machine bolts 39 to the underside of a work table 40. A tie bolt 41 extends through the brackets 38 above the grooves 37. Arcuate relative movement of the edges of plate 35 in the grooves 37 provides in effect a pivotal connection between the table and the arm 5 about a center 42 lying substantially in the plane of the upper surface of the table. An arm 43 is rigidly secured by screws 44 to one of the brackets 38 and the free end of arm 43 is pivotally connected to pivot block 31.

The length of arm 43 is such that the distance between the center of pivotal movement of the table relative to arm 5 and the pivotal center of block 31 is substantially equal to the distance between pivot 33 and the center of shaft 19 about which frame 3 pivots. The length of link 32 is substantially equal to the distance between the center of shaft 19 and the center of pivotal movement of the table relative to arm 5.

By this arrangement arm 43 and link 32 form a toggle and, as screw 29 is rotated by hand wheel 30 it is drawn inwardly or outwardly through threaded block 27, the block 31 moving with it tending to straighten or break the toggle and thereby tilt frame 3 and with it the saw band, as shown in Fig. 3. Since table 40 is fixed to the toggle arm 43 it pivots with it and because of the linkage relationship above described is given a planetary movement about the axis 19, maintaining its horizontal position throughout the range of tilting movement of the frame and saw.

A further and important advantage of this arrangement lies in the fact that the lower guide 15 will always remain a fixed distance from the table 40 and will tilt with the blade 7, thereby removing the necessity for mounting said guide in a slide which would tend to collect sawdust and present an objectionable maintenance problem.

The table is provided (Fig. 6) with a thin slotted plate 45, the position of the slot substantially coinciding with the pivot point 42 so that the slot does not need to be of unusual width to accommodate the tilting movement of the saw.

A spring 46, having one end adjustably connected to the C-frame at 47 and pivotally connected at the other end to the base 1 by a link 48, is provided to in part at least counterbalance the tilting C-frame 3.

The cover 22, which is fixed to and tilts with the C-frame, is provided with an arcuate scale 49 concentric with the lower wheel 6. An indicator 50 is fixed to base 1, and when the C-frame is tilted, as described above, the indicator will indicate the degree to which the blade 7 is inclined relative to the table 40.

Preferably means are provided for positively clamping the frame 3 in any position of angular adjustment. As shown, such means generally indicated at 51 comprises (Fig. 7) a pair of opposed wedge blocks 52 and 53 slidably and non-rotatably mounted in an opening 54 formed in one of the pivotal bearing lugs 24, and engaging the fixed pivot sleeve 2. The blocks 52 and 53 are adapted to be drawn into wedging engagement with the sleeve to lock the frame thereto by means of a rod 55, the inner end portion of which is reduced to form a shoulder 56. Block 53 is slidably mounted on the reduced end portion of rod 55 with its outer end in engagement with shoulder 56, the end of the rod being threaded in block 52 whereby rotation of the rod draws the blocks toward each other and into clamping engagement with the pivot sleeve. The outer end of the rod 55 is provided with a handle 57 for convenience in turning the rod.

The combination of a pivoted saw frame and means to impart a planetary movement to the table as the frame is tilted, makes possible an extremely simple and economical construction by which the table is maintained in a horizontal position throughout the range of angular adjustment of the saw.

While the linkage arrangement above described has certain manufacturing advantages, it will be understood that other means may be employed to secure the planetary movement of the table about the axis of the saw frame pivot. For example, a planetary gear transmission may be inserted between the table and pivot.

As shown in Fig. 8, the fixed base 1 is provided with a fixed gear segment 60 centered at the axis of the pivotal connection between the C-frame 3 and base 1. A planetary gear 61 is fixed to a shaft 62, which is journaled in the lower arm 5 of the C-frame, the gear 61 being positioned to engage and travel over the segment 60 when the C-frame is tilted, as shown in phantom lines. The work table 40 has fixed thereto a gear segment 63 which is centered at the axis 42 about which the table pivots relative to the saw frame. The gear 61 engages segment 63 and as the gear travels over the segment 60 it imparts a planetary motion to the table to maintain the latter horizontal as the C-frame and saw are tilted about the pivotal connection between the frame and base. The tilting of the frame may be accomplished by means of a handwheel, not shown, secured to the shaft 62, or by other suitable means acting on shaft 62 or on the frame or table as previously described.

As shown in Fig. 8, the gear segments 60 and 63 are connected by a single gear 61 in which case the segments are of equal radius, but it will be understood that segments of unequal radius may be used if connected by a gear chain of compensating ratio, the essential feature being that the table and frame tilt in opposite directions through equal angles about their respective pivotal axes.

While the invention has been described in relation to a two-wheel saw, it is equally applicable to machines having three, or more, band wheels.

What is claimed is:

1. In a band-saw machine, a base; a frame pivotally connected to said base; a saw band supporting wheel rotatably carried by the frame, a second saw band supporting wheel rotatably carried by the base and mounted for rotation about the axis of said pivotal connection, a horizontal work table directly and pivotally connected to said frame for movement therewith, the axes of said pivotal connections being parallel, and means to simultaneously pivot said frame and table about their respective pivotal connections through equal arcs to impart an arcuate movement to the table concentric to the axis of the pivotal connection of the frame to the base while the table remains horizontal.

2. In a band-saw machine, a base, a frame pivotally connected to said base, a saw band supporting wheel rotatably carried by the frame, a second saw band supporting wheel carried by the base and mounted for rotation about the axis of said pivotal connection, a horizontal work table carried by the frame and mounted thereon for pivotal movement relative to the frame about an axis parallel to the axis of said pivotal connection between the frame and base, and means to simultaneously pivot said frame and table about their respective pivotal axes in opposite directions through equal arcs to maintain the table horizontal throughout the range of pivotal movement of the frame and table about the axis of the pivotal connection of the frame to the base.

3. In a band-saw machine, a base, a frame pivotally connected to said base, a saw band supporting wheel rotatably carried by the frame, a second saw band supporting wheel carried by the base and mounted for rotation about the axis of said pivotal connection, a work table carried by the frame and mounted for pivotal movement relative to the frame about an axis parallel to the axis of said pivotal connection between the frame and base, a link, one end of which is pivotally connected to the base at a point spaced from the first-mentioned axis, the other end of said link being pivoted to the table at a point spaced from the second axis, said spacings being substantially equal, the length of said link being substantially equal to the distance between said axes, and means to tilt the frame around the first-mentioned axis.

4. In a band-saw machine, a base, a frame pivotally connected to said base, a saw band supporting wheel rotatably carried by the frame, a second saw band supporting wheel carried by the base and mounted for rotation about the axis of said pivotal connection, a work table carried by the frame and mounted for pivotal movement relative to the frame about an axis parallel to the axis of said pivotal connection between the frame and base and lying substantially in the plane of the table surface, a toggle of which one link is pivoted to the base at a point spaced from the first-mentioned axis and the second link is fixed to the table, said links being pivotally connected at a point spaced from the second axis, said spacings being substantially equal, the length of said first link being substantially equal to the distance between said axes, and means operable on one of the links of said toggle to make and break the toggle to tilt the frame around the first-mentioned axis.

5. In a band-saw machine, a base, a frame pivotally connected to said base, a saw band supporting wheel rotatably carried by the frame, a second saw band supporting wheel carried by the base and mounted for rotation about the axis of said pivotal connection, a work table carried by the frame and mounted for pivotal movement relative to the frame about an axis parallel to the axis of said pivotal connection between the frame and base, a toggle of which one link is pivoted to the base at a point spaced from the first-mentioned axis and the second link is fixed to the table, said links being pivoted together at a point spaced from the second axis, said spacings being substantially equal, the length of said first link being substantially equal to the distance between said axes, and means operable on said first toggle link to swing the same about the point at which it is pivoted to the base to tilt said frame around said first-mentioned axis.

6. In a band-saw machine, a base, a frame pivotally connected to said base, a saw band supporting wheel rotatably carried by the frame, a second saw band supporting wheel carried by the base and mounted for rotation about the axis of said pivotal connection, a work table carried by the frame and mounted for pivotal movement relative to the frame about an axis parallel to the axis of said pivotal connection between the frame and base, a toggle of which one link is pivoted to the base at a point spaced from the first-mentioned axis and the second link is fixed to the table, said links being pivoted together at a point spaced from the second axis, said spacings being substantially equal, the length of said first link being substantially equal to the distance between said axes, and means acting on the knee of the toggle to make and break the same, to tilt said frame around said first-mentioned axis, said means including a jack screw pivotally supported at the knee of said toggle and engaged in a threaded block pivoted to said base.

7. In a band-saw machine, a base, a C-frame pivotally connected to said base, said C-frame having spaced upper and lower arms, a saw band supporting wheel rotatably carried by the upper arm of the C-frame, a second saw band supporting wheel carried by the base mounted for rotation about the axis of said pivotal connection, a work table, the free end of the lower arm of said C-frame and the underside of the table being provided with interengaging connecting members, one of said members being provided with arcuate grooves and the other member being provided with arcuate flanges slidably engaging in said grooves to permit pivotal movement of the table relative to the C-frame about an axis parallel to the axis of said pivotal connection between the C-frame and base, a link, one end of which is pivotally connected to the base at a point spaced from the first-mentioned axis, the other end of said link being pivoted to the table at a point spaced from the second axis, said spacings being substantially equal, the length of said link being substantially equal to the distance between said axes, means to tilt the C-frame around the first-mentioned axis, and means to clamp the C-frame in any selected tilted position.

8. In a band-saw machine, a base, a C-frame pivotally connected to said base, said C-frame having spaced upper and lower arms, a saw band supporting wheel rotatably carried by the upper arm of the C-frame, a second saw band supporting wheel carried by the base and mounted for rotation about the axis of said pivotal connection, the free end of the lower arm of said C-frame being formed with an arcuate cradle opening toward the upper C-frame arm, a work table having a pair of spaced parallel trunnion brackets rigidly secured to the underside thereof, the adjacent faces of said brackets being provided with arcuate grooves concentric with said cradle, an arcuate plate concentric with and secured in said cradle, the edges of said plate slidably engaging in said grooves for pivotal movement of the table relative to the C-frame about an axis parallel to the axis of said pivotal connection between the C-frame and the base, a link, one end of which is pivotally connected to the base at a point spaced from the first-mentioned axis, the other end of said link being pivoted to the table at a point spaced from the second axis, said spacings being substantially equal, the length of said link being substantially equal to the distance between said axes, and means to tilt the C-frame around the first-mentioned axis.

9. In a band-saw machine, a base, a frame pivotally connected to said base, a saw band supporting wheel rotatably carried by the frame, a second saw band supporting wheel carried by the base and mounted for rotation about the axis of said pivotal connection, a work table carried by the frame and mounted for pivotal movement relative to the frame about an axis parallel to the axis of said pivotal connection between the frame and base and lying substantially in the plane of the table surface, a toggle of which one link is pivoted to the base at a point spaced from the first-mentioned axis and the second link is fixed to the table, said links being pivotally connected at a point spaced from the second axis, said spacings being substantially equal, the length of said first link being substantially equal to the distance between said axes, means operable on one of the links of said toggle to make and break the toggle to tilt the frame around the first-mentioned axis, and a spring adjustably connected at one end to the frame and pivotally connected at the other end of the base to at least partially counterbalance the tilting frame.

10. In a band-saw machine, a base, a frame pivotally connected to said base, a saw band supporting wheel rotatably carried by the frame, a second saw band supporting wheel rotatably carried by the base and mounted for rotation about the axis of said pivotal connection, a horizontal work table carried by the frame and mounted thereon for pivotal movement relative thereto about an axis parallel to the axis of said pivotal connection of the frame to the base, and a gear train between table and base to simultaneously pivot said frame and table about their respective pivotal axes in opposite directions through equal arcs to maintain the table horizontal throughout the range of pivotal movement of the frame and table about the axis of the pivotal connection of the frame to the base, said gear train including a gear member fixed to the base and a second gear member fixed to the table.

11. In a band-saw machine, a base, a frame pivotally connected to said base, a saw band supporting wheel rotatably carried by the frame, a second saw band supporting wheel carried by the base and mounted for rotation about the axes of said pivotal connection, a work table carried by the frame and mounted thereon for pivotal movement relative to the frame about an axis parallel to the axis of said pivotal connection between the frame and base, a segmental gear fixed to the base and centered at the axis of the pivotal connection between the frame and base, a second segmental gear fixed to the table and centered at the axis of the pivotal connection between the table and frame, and a gear rotatably mounted in said frame and meshing with both said gear segments, said segments being of equal radius.

DAVID ABRAHAM.

References Cited in the file of this patent

UNITED STATES PATENTS

| Number | Name | Date |
|---|---|---|
| 797,321 | Rishebarger | Aug. 15, 1905 |
| 798,519 | Manning | Aug. 29, 1905 |
| 814,652 | Harrold et al. | Mar. 6, 1906 |
| 936,596 | Anderson | Oct. 12, 1909 |

FOREIGN PATENTS

| Number | Country | Date |
|---|---|---|
| 613 | Great Britain | Feb. 19, 1873 |
| 10,460 | Great Britain | Aug. 16, 1886 |